US012555376B2

(12) United States Patent
Husheer et al.

(10) Patent No.: US 12,555,376 B2
(45) Date of Patent: Feb. 17, 2026

(54) CASCADED FEATURE DETECTORS FOR IMPROVED STREAM PROCESSING EFFICIENCY

(71) Applicant: HEARTFELT TECHNOLOGIES LTD, Cambridge (GB)

(72) Inventors: Shamus Louis Godfrey Husheer, Cambridge (GB); Gareth Paul Williams, Cambridge (GB); Michał Nieznański, Cambridge (GB)

(73) Assignee: Heartfelt Technologies Ltd, Cambridge (GB)

( * ) Notice: Subject to any disclaimer, the term of this patent is extended or adjusted under 35 U.S.C. 154(b) by 542 days.

(21) Appl. No.: 17/911,106

(22) PCT Filed: Mar. 10, 2021

(86) PCT No.: PCT/IB2021/051944
§ 371 (c)(1),
(2) Date: Sep. 12, 2022

(87) PCT Pub. No.: WO2021/181264
PCT Pub. Date: Sep. 16, 2021

(65) Prior Publication Data
US 2023/0108401 A1    Apr. 6, 2023

(30) Foreign Application Priority Data
Mar. 10, 2020    (GB) ...................................... 2003434

(51) Int. Cl.
*G06V 10/774*    (2022.01)
*G06T 7/00*    (2017.01)
(Continued)

(52) U.S. Cl.
CPC ............ *G06V 20/41* (2022.01); *G06T 7/0012* (2013.01); *G06V 10/774* (2022.01); *G06V 20/46* (2022.01);
(Continued)

(58) Field of Classification Search
None
See application file for complete search history.

(56) References Cited

U.S. PATENT DOCUMENTS

| 2011/0274315 A1* | 11/2011 | Fan ......................... G06T 7/277 |
| | | 382/103 |
| 2013/0070969 A1* | 3/2013 | Hu ..................... G06F 18/24323 |
| | | 382/107 |

(Continued)

FOREIGN PATENT DOCUMENTS

| JP | 1994096210 A1 | 4/1994 |
| JP | 2004120595 A1 | 4/2004 |

(Continued)

OTHER PUBLICATIONS

Office Action issued by Japanese Patent Office, mailing date of Dec. 10, 2020. Japanese application No. JP2022-554467.

(Continued)

*Primary Examiner* — Tsung Yin Tsai
(74) *Attorney, Agent, or Firm* — Fresh IP PLC; Clifford D. Hyra; Aubrey Y. Chen

(57) ABSTRACT

A computer implemented method of data processing comprises receiving an input data stream; identifying, by a first algorithm, one or more first content features of the data stream; determining, based on at least one output of the first algorithm, one or more portions of the data stream to be stored in a first buffer; storing the determined portions in the first buffer; identifying, by a second algorithm, one or more second content features of the data stream using the stored (Continued)

portions of the data stream; and generating, for output to a user, an output based on the identified second content features; wherein the second algorithm is computationally more complex than the first algorithm.

13 Claims, 6 Drawing Sheets

(51) Int. Cl.
*G06V 20/40* (2022.01)
*G06V 40/16* (2022.01)
*G06V 20/52* (2022.01)

(52) U.S. Cl.
CPC .. *G06V 40/168* (2022.01); *G06T 2207/10016* (2013.01); *G06T 2207/20081* (2013.01); *G06T 2207/20084* (2013.01); *G06T 2207/30004* (2013.01); *G06T 2207/30201* (2013.01); *G06T 2207/30232* (2013.01); *G06T 2207/30242* (2013.01); *G06V 20/53* (2022.01); *G06V 2201/03* (2022.01)

(56) References Cited

U.S. PATENT DOCUMENTS

| | | | |
|---|---|---|---|
| 2014/0348434 A1* | 11/2014 | Xu | G06V 10/25 |
| | | | 382/228 |
| 2017/0091953 A1 | 3/2017 | Bleiweiss et al. | |
| 2018/0173940 A1* | 6/2018 | Ye | G06V 40/103 |
| 2019/0043201 A1 | 2/2019 | Strong et al. | |
| 2022/0125359 A1* | 4/2022 | Persaud | G06V 40/161 |

FOREIGN PATENT DOCUMENTS

| | | |
|---|---|---|
| JP | 2004248090 A1 | 9/2004 |
| JP | 2008042696 A1 | 2/2008 |
| JP | 2019080115 A1 | 5/2019 |

OTHER PUBLICATIONS

International Search Report and Written Opinion for PCT/IB2021/051944, mailing date of Jun. 11, 2021.
Intention to Grant—Communication under Rule 71(3) EPC issued by the European Patent Office, mailing date of Jun. 23, 2025. EP Application No. 21714674.5.

* cited by examiner

CASCADED FEATURE DETECTORS FOR IMPROVED STREAM PROCESSING EFFICIENCY

FIELD OF THE INVENTION

The invention relates to the analysis of streams of data, where a large fraction of the stream of data is not "of interest". In particular, the invention relates to the analysis of data from, for example, a video camera or security camera, a microphone for voice control, or a stream of data for medical diagnosis.

BACKGROUND

There are numerous applications where an electronic system attempts to monitor a stream of data over time, where much of the time not much "of interest" is happening.

For example, an "intelligent video camera" as may be implemented for security, process monitoring, healthcare or numerous other applications. The stream of data in this case consists of video image frames, and may include audio streams. This disclosure equally applies to any other application involving the monitoring of a stream of data, for example monitoring sensor output from an industrial process, listening for voice commands on a smart speaker, or processing a set of data that has previously been written to a stored medium (e.g. a video file, or even automatically processing a text file representing a work of literature).

Existing implementations may involve detecting a change in the data stream (e.g. a movement detector in video) in order to minimize the processing required, and therefore computational hardware and thus cost and power, during those periods where not much "of interest" is happening. However, a complex understanding of what is "of interest" remains a challenge. This results in a high "false positive" rate, because it is generally beneficial to minimise the chance of a "false negative", and this results in a higher than optimal processing cost, as well as a high associated hardware cost.

Using the "intelligent video camera" example, a processing algorithm (for example, a neural network) may be used to fully process an image or a recent stream of images. This requires considerable computational power. FIG. 1 shows a schematic of such a basic intelligent video camera 1 comprising a video camera 110, neural network 120 and output 130. The computer hardware always runs the neural network on every frame (i.e. 100% hardware cost and power consumption).

If the stream of images is mostly unchanging, existing implementations may include a motion detector to check to see if an image is substantially similar to the previous image, prior to sending it to the main algorithm. FIG. 2 shows such an intelligent video camera 2 with motion detection, comprising a video camera 210, movement detector 220, neural network 230 and output 240. If there is continuous movement in the scene for a period of time, then the main algorithm 220 will have to process every video frame. Thus the computational hardware needs to be matched to the capability of the algorithm running continuously.

Any saving from running the motion detector is a power saving only, rather than a hardware cost saving, because the computer hardware still has to be able to run the neural network 220 on every frame, so hardware cost is 100% but power consumption on average will be reduced to, for example, 10%.

In some conventional implementations, the video camera may offload the more complex algorithm to a server over a network, meaning that the camera hardware can be relatively low cost, but the network connection needs to be able to cope with the peak data rate from the camera, which also comes at a significant cost.

The present invention is directed towards reducing the processing required both during those periods where not much "of interest" is happening, and during extended period of peak operation, thus reducing the computational hardware power requirements and cost of the system.

SUMMARY

The present disclosure describes techniques, methods, systems, and other mechanisms for data analysis and image processing.

According to a first aspect of the present invention, a computer-implemented method is provided, including receiving an input data stream; identifying, by a first algorithm, one or more first content features of the data stream; determining, based on at least one output of the first algorithm, one or more portions of the data stream to be stored in a first buffer; storing the determined portions in the first buffer; identifying, by a second algorithm, one or more second content features of the data stream using the stored portions of the data stream; and generating, for output to a user, an output based on the identified second content features. The second algorithm is computationally more complex than the first algorithm.

The method may include determining, based on at least one output of the first algorithm, one or more stored portions of the data stream to be removed from the first buffer; and removing the determined portions from the first buffer.

The first algorithm may include a plurality of processing layers and the portions of the data stream to be stored are determined based on an upper layer output of the first algorithm.

The first content features may be substantially the same as the second content features.

The first algorithm and the second algorithm may be trained using a common training data set and a common training goal.

The method may include a step of pre-processing the one or more portions of the data stream to be stored in the first buffer, prior to storing the determined portions in the first buffer.

The determining may include determining a substantially fixed proportion of the data stream to be stored in the first buffer.

The method may include updating the first algorithm based on the identification of one or more second content features by the second algorithm.

One or more of the first content features identified by the first algorithm may be stored in a second buffer.

Determining one or more portions of the data stream to be stored in a first buffer may be based at least in part on the first content features stored in the second buffer.

The data stream may be a video stream comprising a plurality of image frames; and the first content features and second content features may be image features of the image frames.

The image features may correspond to people; and the generated output may be based on an estimated number of people in the video stream.

The image features may correspond to one or more diagnostic indicators; and the generated output may include at least one diagnostic indication for aiding a diagnosis.

According to a second aspect of the present invention a data processing apparatus is provided including an input for receiving an input data stream; a processor; and an output. The apparatus is configured to perform the method of the first aspect.

According to a third aspect of the present invention a storage medium is provided and is configured to store instructions which, when executed by a processor, cause the processor to perform the method of the first aspect.

Optional features are as set out in the dependent claims.

BRIEF DESCRIPTION OF DRAWINGS

The details of one or more examples of the disclosure are set forth in the accompanying drawings and the description below. Other features, objects and advantages will be apparent from the description and drawings, and from the claims.

DETAILED DESCRIPTION

Figure 1:
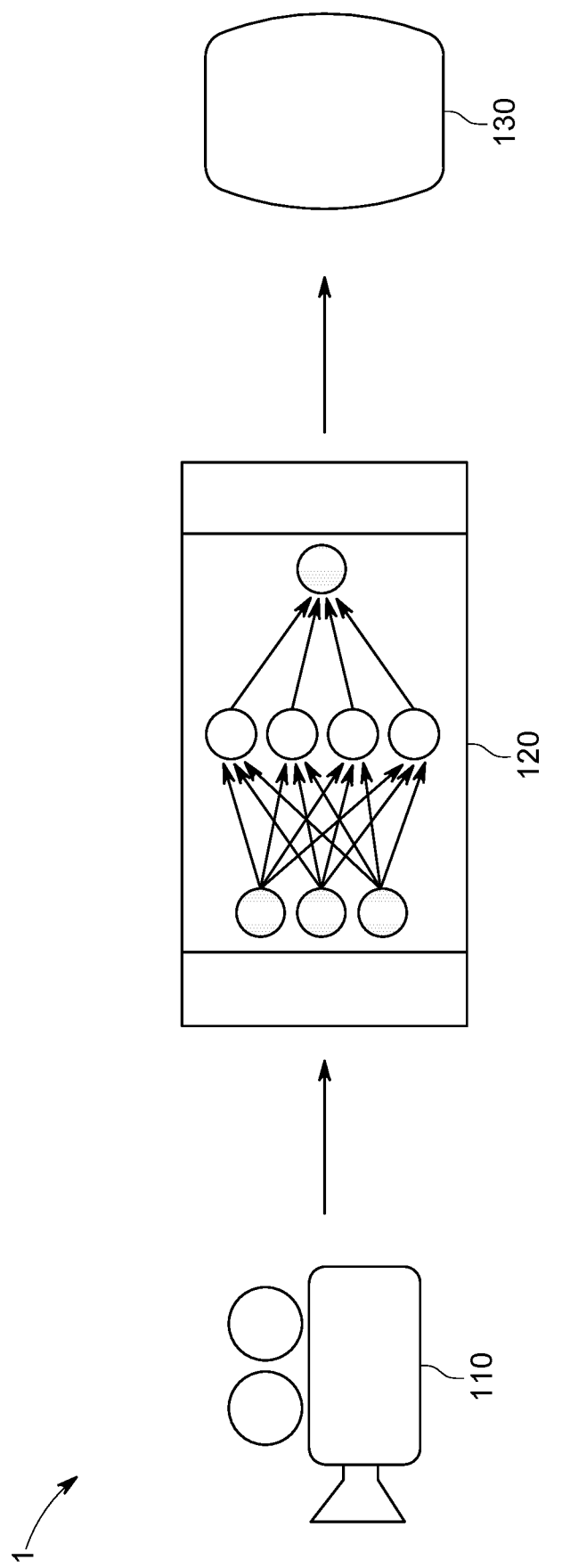
FIG. 1 is a schematic of a basic intelligent video camera.
Figure 2:
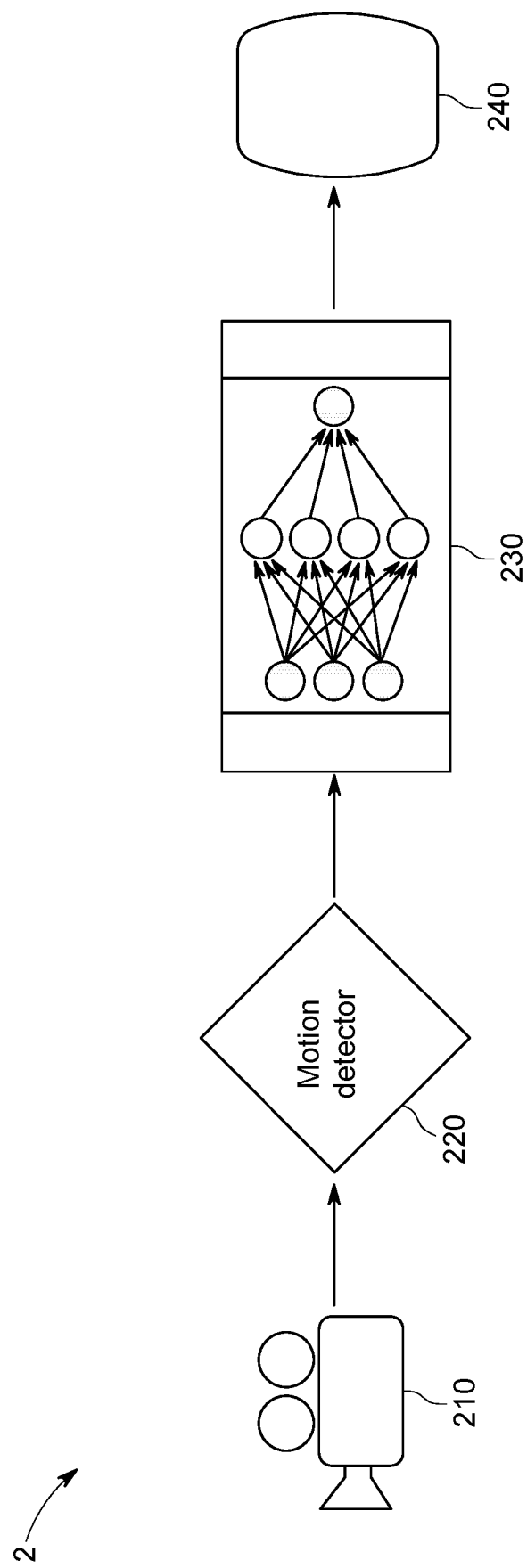
FIG. 2 is a schematic of a video camera with motion detection.
Figure 3:
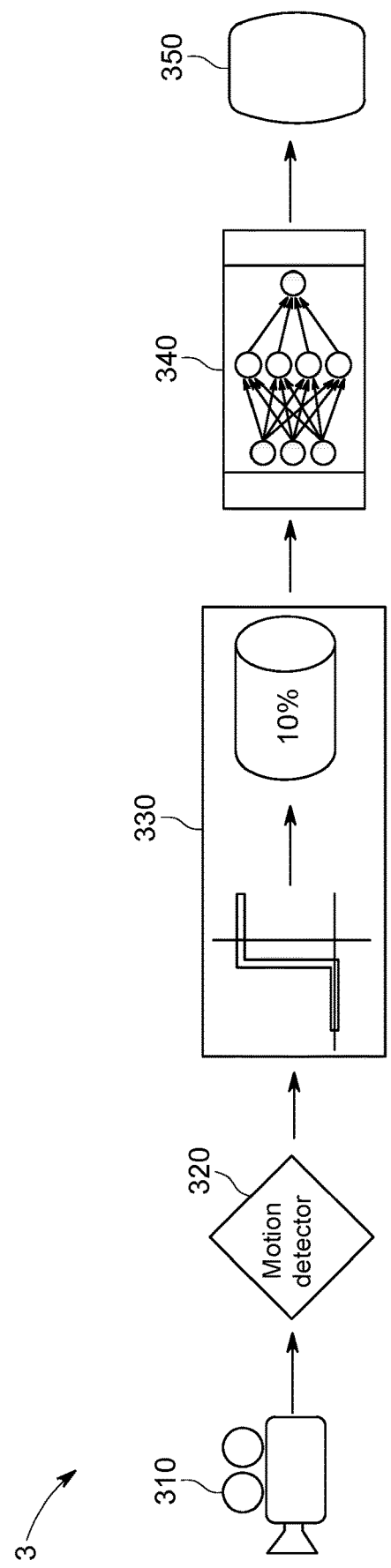
FIG. 3 is a schematic of a video camera with motion detection and dynamic threshold buffering according to an embodiment.

FIG. 3 shows an image capture and image processing apparatus 3 with motion detection and dynamic threshold buffering, according to an embodiment. The apparatus 3 comprises a video camera 310, movement detector 320, dynamic threshold buffer 330, a neural network 340 and an output 350.

The video camera 310 is configured to receive an input data stream, comprising video data. The video camera 310 is configured to capture video data in the form of a plurality of video image frames. The plurality of captured video image frames may form an input data stream.

The movement detector 320 is configured to receive the plurality of video image frames from the video camera 310. The movement detector 320 is configured to detect movement in one or more of the video image frames. The movement detector 320 may execute an image processing algorithm to detect movement. For example, the movement detector 320 may be configured to detect a change in pixel intensity in the input data stream. The movement detector 320 may be considered to identify one or more content features of the input data stream e.g. a changing pixel, which may correspond to a moving object. For example, the movement detector 320 may identify the presence of one or more moving objects by the detection of movement in the video data. The movement detector 320 may be configured to cache a plurality of video image frames in which movement is detected e.g. by writing to disk.

The dynamic threshold buffer 330 is configured to store one or more portions of the input data stream. The dynamic threshold buffer 330 is configured to store one or more of the plurality of video image frames in which movement is detected. The dynamic threshold buffer 330 is configured to determine the portions of the input data stream to be stored based on the movement detected by the movement detector 320. For example, the dynamic threshold buffer 330 may reject portions of the video that fall below a dynamic movement threshold.

The dynamic threshold buffer 330 may be configured to determine a substantially fixed proportion of the data stream to be stored in the first buffer. For example, the dynamic threshold buffer 330 may be fixed at 90% rejection, such that 90% of the video image frames are discarded and 10% are retained. The dynamic threshold buffer 330 may use a dynamic threshold technique to determine a sensitivity to movement of the dynamic movement threshold. For example, during periods of relatively little motion in the scene, the dynamic threshold may fall until even at this reduced motion level a consistent 10% of images are stored in the cache, with the neural network 340 processing the reduced data stream.

During periods of increased movement the buffer may reject portions of the video that fall below a dynamically increasing threshold. The dynamic threshold buffer 330 may determine one or more stored portions of the data stream to be removed from the first buffer. For example, when a person walks past the camera, all frames coming in will exhibit much higher motion estimates than those presently in the buffer, causing eviction of many low-movement frames from the buffer. This can allow the buffer to effectively buffer a short period of interesting activity.

If motion continues within the scene, the dynamic threshold is automatically increased, and eventually the system stabilises at a new threshold value that results in only 10% of images being stored in the cache. In this way, the subsequent neural network 340 can be run on a constant fraction of all of the input data stream. The computer hardware only has to be capable of running the neural network 340 on 10% of the data. The neural network 340 can process only the highest priority images in the cache at any one time (priority typically being a combination of age and motion level), with a dynamic threshold adjustment algorithm ensuring that the cache always contains sufficient data for the algorithm to continue processing.

In this way, the apparatus 3 reduces the amount of computation required to assess a particular portion of the input data stream as "not of interest", so that it can be discarded. This provides a principled method of prioritizing (therefore reducing latency for) "important" data. It is possible to save both power and computational hardware cost, as it is possible to process only a fixed proportion of the most "interesting" part of the data with the neural network 340.

As such, power consumption can be reduced to approximately 10% and the hardware cost can be reduced to approximately 10%. In other implementations, a retention threshold may be set, e.g. 5% or 15% according to the system requirements. The retention threshold may be anywhere in the range of 0%-50%.

In some examples, the retention threshold may be adjusted to allow dynamic improvement of the false-positive/false-negative rate of the system based on the data stream being observed. For example. The threshold may be adjusted to improve the system in a particular intelligent video camera, on the basis of the scene being observed by that camera.

The neural network 340 is configured to identify one or more content features of the input data stream. The neural network 340 is an example of an algorithm for identifying content features. The neural network 340 is configured to use the stored portions of the data stream. It can be seen that the neural network 340 is computationally more complex than the movement detector 320.

In some examples, the input data stream may be a video stream comprising a plurality of image frames; and the content features may be image features of the video image frames. The content features may correspond to people; and the neural network 340 may be configured to estimate a number of people in the video stream. The output of a final layer of the neural network 340 may be a single value, being the count of people in the video stream.

The output 350 is configured to generate, for output to a user, an output based on the identified content features provided by the neural network 340.

Figure 4:
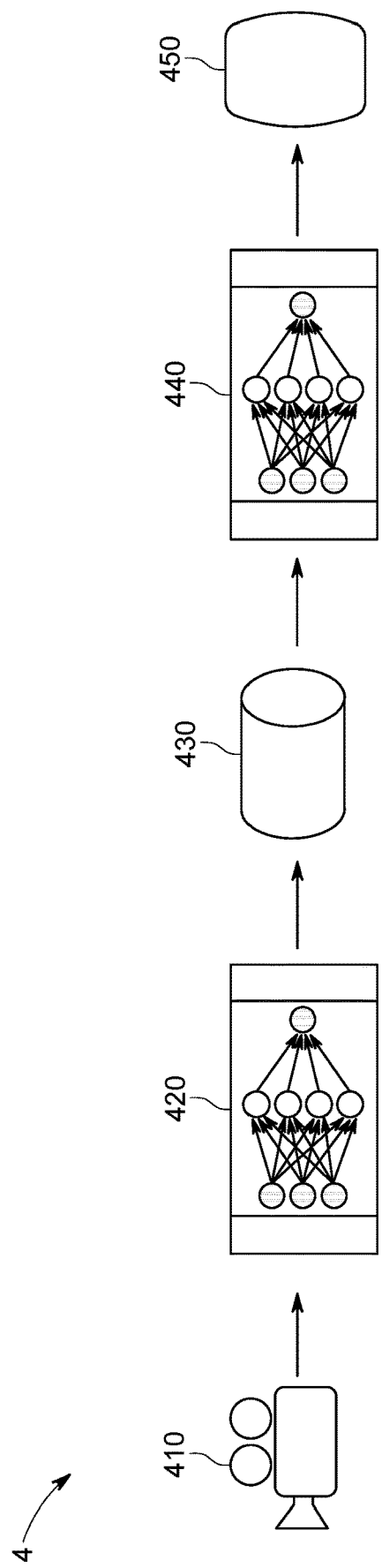
FIG. 4 is a schematic of a video camera with a cascade of algorithms and caches according to an embodiment.

FIG. 4 shows an image processing apparatus 4 with a cascade of algorithms with caches, according to an embodiment. In the embodiment described above, there may be a difference in definition of "interesting" between the movement detector 320 and the neural network 340. An ideal movement detector would be sensitive to only those elements of the image that the neural network is sensitive to, but this essentially means producing the same outputs as the neural network itself. This would require similar computational cost, meaning no savings whatsoever.

In some embodiments, a cascade of algorithms of increasing computation complexity may be trained. The algorithms may be neural networks. The neural networks may each be trained against similar training data. The cascade of algorithms of increasing computational complexity may each attempt to more closely detect features "of interest" than the previous. In some embodiments, earlier stages of the cascade can be dynamically improved over time to more closely match the output of later stages of the cascade given the actual data observed.

The apparatus 4 comprises a video camera 410, a first neural network 420, a buffer 430, a second neural network 440 and an output 450. Elements not described are substantially as described with respect to FIG. 3.

The video camera 410 is configured receive an input data stream, comprising video data. The video camera 410 is configured to pass the input data stream immediately into the first neural network 420.

The first neural network 420 is configured to identify one or more content features of the input data stream. The neural network 420 is an example of an algorithm for identifying content features. The first neural network 420 may be considered to function as a coarse filter for images of interest.

In some examples, the input data stream may be a video stream comprising a plurality of image frames; and the content features may be image features of the video image frames. The image features may correspond to people; and the neural network 420 may be configured to estimate a number of people in the video stream. The output of a final layer of the neural network 420 may be a single value, being the count of people in the video stream.

The neural network 420 further comprises one or more additional layers inside the network. The additional layers may respond to various elements in the image. For example, one or more layers may be configured to respond to human shaped blocks of different contrast etc. In one or more layers near the output of the network, because of the hierarchical structure of deep convolutional neural networks, there will be internal representations of the image that respond more to the desired content features. These layers may be referred to as the "upper layers". For example, one or more upper layers may response more strongly to the number of people in the room than to other content features of the datasets used to train them.

Figure 5:
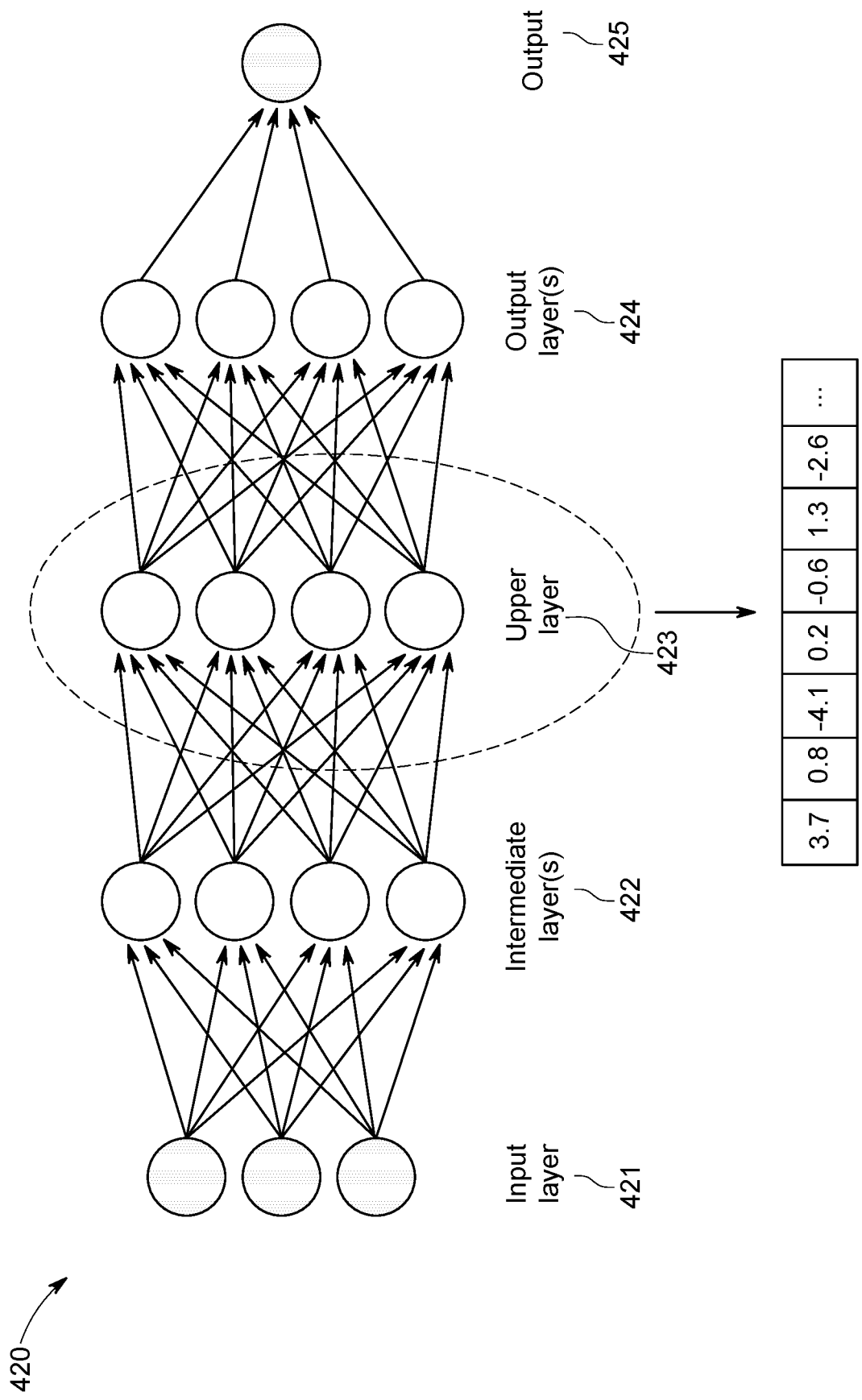
FIG. 5 is a schematic of a deep convolutional neural network according to an embodiment.

FIG. 5 shows a representation of the neural network 420 according to an embodiment.

The neural network 420 includes a plurality of processing layers. The neural network 420 comprises an input layer 421, one or more intermediate layers 422, an upper layer 423, one or more output layers 424 and an output 425.

The upper layer 423 prior to the output layer 424 is highlighted, and the upper layer 423 activations are shown as a vector. In some examples, the portions of the input data stream to be stored in a buffer may be determined based on the upper layer output.

The activations of such an "upper layer" can be treated as a point in a high-dimensional space, summarising the image processed by the neural network. In this way, the distance between any two such points can provide a measure of "similarity" between two images. In some examples, this concept of "similarity" may be specifically in the sense of a change of the output of the algorithm, e.g., the count of people in the room.

Returning to FIG. 4, the buffer 430 is configured to store one or more portions of the input data stream. The buffer 430 may be configured to store one or more of the content features identified by the neural network 420. The buffer 430 may store one or more images of interest from the input data stream prior to ingestion by the second neural network 440. The apparatus 4 is arranged with a buffer between the algorithms, to ensure that high priority changes in the input data stream can be quickly propagated through the cascade.

In some examples, the method may include a step of pre-processing the one or more portions of the input data stream to be stored in the buffer 430, prior to storing the determined portions in the buffer 430. In some embodiments, addition to/discard from the buffer 430 may be controlled at least partly by a mathematical distance metric. The mathematical distance metric may be measured between the current sample under consideration and either the samples collected around it in time, or some of the samples in the cache. For example, an item may enter the buffer 430 if the distance metric is large compared to adjacent samples in time. The distance metric may indicate that the data stream has changed in a way that is deemed to be interesting by the neural network 420.

In some examples, determining one or more portions of the input data stream to be stored in the buffer 430 may be based at least in part on one or more content features stored in a second buffer. For example, a second buffer may be configured to store the "upper layer" output from neural network 420. The second buffer may continuously evaluate the mathematical distance between all of the stored images, to maximise a diversity of cached content. In this way, it can avoid the buffer 430 filling up if the images toggle between two interesting states. For example, a case where one person walks in and out of the frame repeatedly would change the count of people frequently in time, but in a way that might not be considered to be particularly important.

The choice of distance metric (euclidean distance, cosine distance, etc), the pre-processing of dimensions of the point (normalising, combining, etc) and the choice of depth from the output of the neural network 420 are engineering choices. The distance metric may be used by the buffer 430 between the first neural network 420 and the second neural network 440 in order to decide which images are sufficiently interesting to retain. For example, if the output of the neural network 420 contains more features then the distance metric may incorporate this information. For example, if the neural network 420 provides an estimate of the gender ratio of people in the room, a scene containing 10 men may be considered only somewhat similar to a scene containing 10 women.

The second neural network 440 is configured to identify one or more content features of the input data stream. The neural network 440 is an example of an algorithm for identifying content features. The neural network 440 is configured to use the stored portions of the data stream in the buffer 430. The neural network 440 may be computationally more complex than the neural network 420. Second content features identified by the second neural network 440 may be substantially the same as first content features identified by the first neural network 420. The first neural network 420 and the second neural network 440 may be trained using a common training data set and a common training goal.

In some examples, the input data stream may be a video stream comprising a plurality of image frames; and the second content features may be image features of the video image frames. The image features may correspond to people; and the second neural network 440 may be configured to estimate a number of people in the video stream. The output of the neural network 440 may be a single value, being the count of people in the video stream.

The output 450 is configured to generate, for output to a user, an output based on the identified content features provided by the second neural network 440.

By implementing the apparatus 4, the "false positive" and "false negative" rate of the cascade of algorithms can be reduced below that of system with a simple digital signal processing step followed by a complex algorithm, such as apparatus 3. In this way, both the peak and average computational power can be further reduced, and so the associated hardware cost can also be reduced, compared with existing approaches.

Such an application of the apparatus 4 can utilise a lower complexity algorithm as a filter for only some content features that a more complex algorithm is configured to identify in the data stream. In this way, it is possible to optimise complexity, hardware cost or power consumption for those hardware elements that can be efficiently used to select portions of the data stream to pass to the more complex algorithm. In some examples, a face recognition algorithm is configured to extract a great many features from an input image and so is comparatively complex. However, a lower complexity algorithm may identify a subset of features related to faces (e.g. presence/absence of a face, and landmarks such as nose, eyes and ears).

The apparatus 4 can provide a disciplined approach to prioritise "diversity" of samples within a dataset (i.e. within the cache, or of samples sent for final stage processing). Diversity may be defined as a mathematical distance function between samples. The function may define what content features in the samples are most of interest. In some examples, e.g. utilising this ability in an intelligent video camera for crowd surveillance, can enable the automatic prioritisation of face detection on different faces, or different views of the same face. In some examples, this can be achieved without requiring the full computationally expensive face detection algorithm to be run on all samples.

Prioritising diversity in a buffer using the lower complexity algorithm can result in the more complex algorithm running on a wide range of face locations/orientations within the data stream. This can be achieved without prioritising uniqueness of the faces themselves. In some examples, some or all of the content features identified by the lesser complexity algorithm may be different from those content features identified by the more complex algorithm. The lower complexity algorithm can operate as an effective filter on the input data stream to identify a portion of the input data stream that is more of interest to the more complex algorithm. For example, the lower complexity algorithm may be configured to identify head/neck/shoulders of people, in order to crop around each part of an image likely to contain a face, whereas the more complex algorithm may be configured to perform facial recognition on the cropped partial images.

In some embodiments, the concept of diversity can be enforced across multiple cache layers, or the system as a whole. For example, the vector of upper layer outputs described in FIG. 5 may be used such that each new image is compared not only to the contents of the cache immediately following the first neural network, but also the contents of one or more later stage caches. In some examples, images highly similar to those that have already passed through the whole filter chain can be discarded. In some examples, vectors associated with images that have passed, or been discarded by, later stages may be retained in circular buffers. In this way, images that appear interesting to the simpler front-end networks, but are deemed uninteresting by later stages, are not needlessly re-processed if a very similar image is seen again. This approach can ensure that the storage space for images to be processed by later stages can be prioritised towards images unlike those already seen.

In some embodiments, incorporating the age of images in the cache acceptance/rejection logic can assist in ensuring image freshness as well as diversity. In some examples, the distance metric between two images may be divided by the difference in ages. In this way, the threshold of similarity for inclusion into the cache may be configured to be age-dependent.

The "velocity" of images through the cache may be defined as the amount of time that an image has spent in a cache prior to eviction. In some examples, images may be made available to the second stage of the cascade only once they spend longer than a pre-determined (and possibly dynamically adjustable) period in the first level cache. In this way, a maximum average throughput of images can be enforced between stages of the cascade. In this way, a case can be avoided where a promising image is rapidly replaced by an even more promising image with a similar distance metric.

For example, in a case where a person walks into view and then pauses, the acceptance logic may prefer frames with lower inter-frame motion (therefore blur), although the two images might be semantically similar (i.e. have a low distance metric). It would be inefficient to immediately pass the potentially blurred image to the second stage for processing, without checking that at least some small time period has passed without a better image being captured. The concept of velocity can also prevent a cold-start problem, where the caches are all initially empty. In such cases, substantially all the initially observed images may enter the cache and it is likely that the bulk of these images will be evicted very shortly thereafter in favour of slightly better or more diverse images. By enforcing a minimum time spent in the cache before passing to the next level, the system can avoid swamping the next level network and cache with redundant data. This can be particularly advantageous if the media for the different caches have different write speeds (e.g. RAM vs SSD).

In some embodiments, one or more intermediate algorithms may output values in a meaningful form (e.g. an estimate of number of people, as opposed to just dimensionless number(s)). In some examples, the output values may be used to prioritise or de-prioritise parts of the dataset based on these earlier stage outputs. For example, in a people-counting video camera used for crowd monitoring, one or more images may be discarded where the count is estimated to be lower than a certain level by a very small neural network. In the case of relatively complicated outputs from algorithms, different elements of the output might be more useful at different stages of the cascade. For example, the position of an object of interest may be useful as well as the presence or absence of that object. In some examples, if it is highly probable that the object of interest is not present, images may be de-prioritised even if they have a large similarity distance from previous images.

In some embodiments, it is possible to train filters with multiple outputs. Some outputs may be used as quality calculations to make decisions about keeping or discarding images. Some outputs may be used as diversity calculations to minimise repetitive images being processed. In the case of a facial recognition system, a quality output may be a classifier that indicates the probability of a face in the image, whilst a diversity output may be an estimate of the face-to-camera angle. In some examples, the upper layer components that encode quality outputs may be separated from those that encode diversity outputs. In this way, using the vector of upper layer activations for distance metrics in choosing images to go into the cache does not inadvertently maximise the diversity of quality in the cache. In this way, it is possible to avoid the diversity filtering step producing the widest possible range of likelihood of faces appearing in images, rather than the widest possible range of face angles. For example, upper layer activations that determine quality can represent the likelihood of a face being present in various locations of the image. Including these components in the distance metric for diversity purposes can inadvertently prioritise the same face, at the same angle to camera, as it moves around the image. In some examples, the set of features from which diversity is calculated may be less than the full set of features that the network generates.

Figure 6:
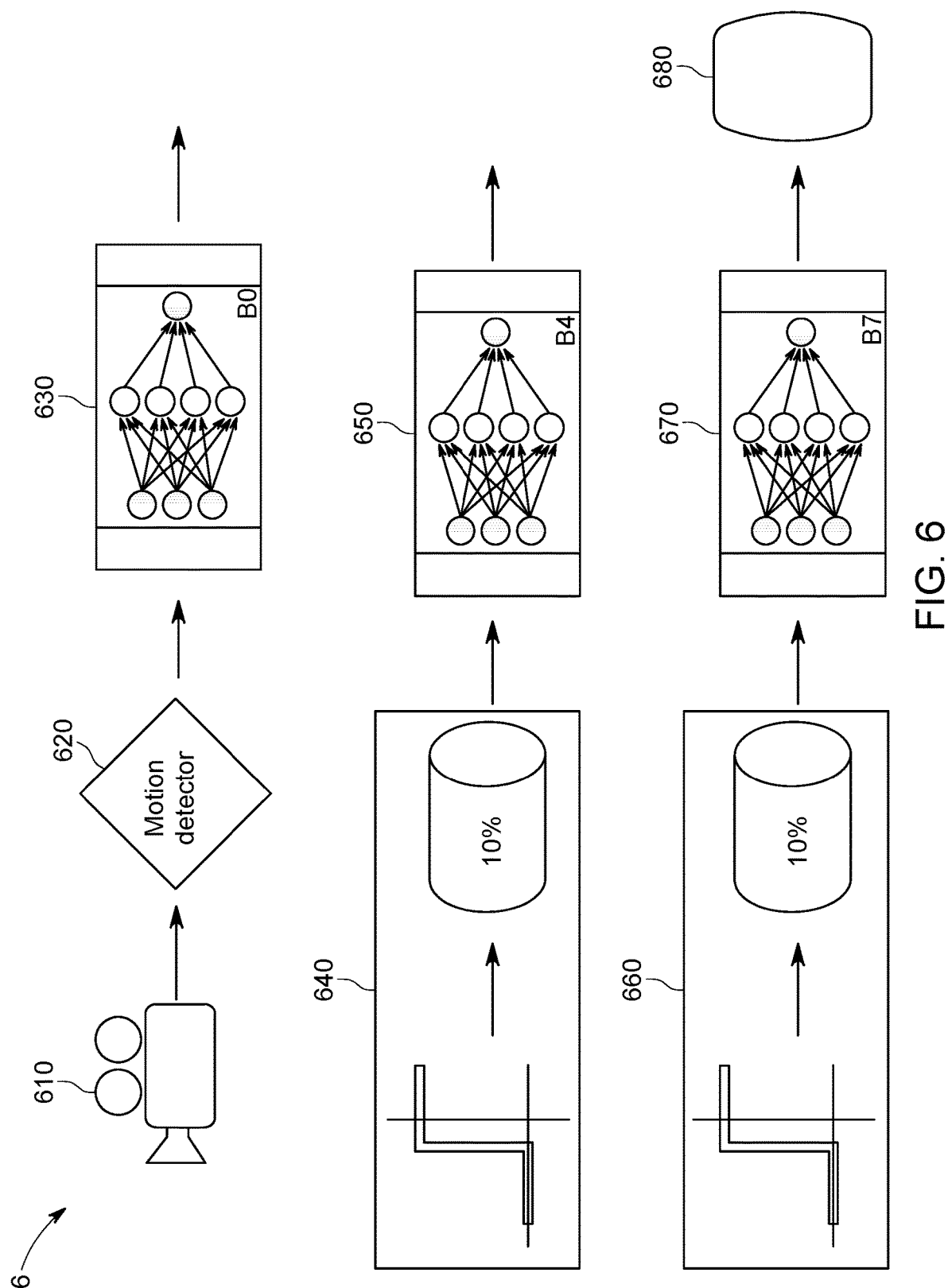
FIG. 6 is a schematic of a video camera with motion detection and a cascade of algorithms and caches according to an embodiment.

FIG. 6 shows an image processing apparatus 6 with a cascade of algorithms and caches, according to an embodiment. In some examples, an intelligent video camera may include the apparatus 6 and may be configured for a specific application, such as counting the number of people in a room. If there is no motion between frames, the output of the main algorithm for the number of people in the room will not change, so the apparatus 6 may comprise a simple motion detector as the first element of the cascade.

The apparatus 6 may be implemented using a simple motion detector at the front end. The subsequent elements in the cascade may be deep convolutional neural networks of varying complexity. The apparatus 6 may comprise a series of deep convolutional neural networks (CNNs), e.g., CNNs with a modified "EfficientNet" architecture. Some of the EfficientNet family of architectures are known as B0, B4 and B7. The neural networks may be configured to operate on copies of an image that have been downsampled to varying degrees. All of the neural networks may have been trained for the same task e.g. to count people. Although the system is described based on neural networks, the invention is applicable to any alternative digital signal processing techniques.

The apparatus 6 comprises a video camera 610, a movement detector 620, a first neural network 630, a first cache 640, a second neural network 650, a second cache 660, a third neural network 670 and an output 680.

The video camera 610 is configured to receive an input data stream, comprising video data. The video camera 610 is configured to capture video data in the form of a plurality of video image frames. The plurality of captured video image frames may form an input data stream.

The movement detector 620 is configured to receive the plurality of video image frames from the video camera 610. The movement detector 620 is configured to detect movement in one or more of the video image frames. The movement detector 620 may execute an image processing algorithm to detect movement. For example, the movement detector 620 may be configured to detect a change in pixel intensity in the input data stream. The movement detector 620 may be considered to identify one or more content features of the input data stream e.g. a changing pixel, which may correspond to a moving object. For example, the movement detector 620 may identify the presence of one or more moving objects by the detection of movement in the video data. The movement detector 620 may be configured to feed a plurality of video image frames in which movement is detected to the first neural network 630.

The first neural network 630 is configured to identify one or more content features of the input data stream. The neural network 630 is an example of an algorithm for identifying content features. The first neural network 630 may be a B0 neural network. The B0 neural network may have a typical compute requirement for an image of 0.4 GFLOPs, and a top-1 ImageNet error of 23.7%. The first neural network 630 may be considered to function as a coarse filter for images of interest.

In some examples, the input data stream may be a video stream comprising a plurality of image frames; and the content features may be image features of the video image frames. The image features may correspond to people; and the neural network 630 may be configured to estimate a number of people in the video stream. The output of a final layer of the neural network 630 may be a single value, being the count of people in the video stream.

The first cache 640 is configured to store one or more portions of the input data stream. The first cache 640 may be configured to store one or more of the content features identified by the first neural network 630. The first cache 640 may store one or more images of interest from the input data stream prior to ingestion by the second neural network 650. The apparatus 6 is arranged with a buffer between the algorithms, to ensure that high priority changes in the input data stream can be quickly propagated through the cascade.

The second neural network 650 is configured to identify one or more content features of the input data stream. The second neural network 650 is an example of an algorithm for identifying content features. The second neural network 650 may be a B4 neural network. The B4 neural network may have a typical compute requirement for an image of 4.2 GFLOPs, and a top-1 ImageNet error of 17.4%.

Given the difference in computational complexity between the B0 neural network and the B4 neural network, it may be desirable to have the first cache 640 between them retain at most roughly 0.4/4.2 of the frames between these stages. In this way, computation is roughly spread between the networks. In some examples, the first cache 640 may be configured to retain roughly 10% of the frames.

The second cache 660 is configured to store one or more portions of the input data stream. The second cache 660 may be configured to store one or more of the content features identified by the second neural network 650. The second cache 660 may store one or more images of interest from the input data stream prior to ingestion by the third neural network 670.

The third neural network 670 is configured to identify one or more content features of the input data stream. The third neural network 670 is an example of an algorithm for identifying content features. The third neural network 670 may be a B7 neural network. The B7 neural network may have a typical compute requirement for an image of 37 GFLOPs, and a top-1 ImageNet error of 15.6%.

Given the difference in computational complexity between the B4 neural network and the B7 neural network, it may be desirable to have the second cache 660 between them retain at most roughly 4.2/37 of the frames between these stages. In this way, computation is roughly spread between the networks. In some examples, the second cache 660 may be set to retain roughly 10% of the frames.

The output 680 is configured to generate, for output to a user, an output based on the identified content features provided by the third neural network 670.

In the apparatus 6, the hardware only has to be capable of processing at roughly 1.2 GFLOPs/input image. However, the output 680 provides images that have been processed with a 37 GFLOP end-stage neural network. In this way, the apparatus 6 can provide an approximately 30× reduction in required computational power. The movement detector can reduce average power consumption, but not peak power consumption or hardware cost. The cascaded network of apparatus 6 is configured to generate final outputs for only 1% of images on average, which is acceptable e.g. when considering a security camera that spends the vast bulk of the time looking at a relatively static scene.

In some embodiments, the apparatus 6 may allow for early stopping if a lower level network produces a result with a certain confidence. In some examples, the output of the intermediate neural networks is used to assist in prioritisation in the cache, which can lead to early stopping. In some examples, the intermediate neural networks may output an indication of confidence. For example, object classifiers may yield a probability of match, such that clear matches are made apparent. This can allow the system to use an intermediate-level network output instead of running the final stage network when the data is easily classified. This approach can save more power or provide higher throughput.

In addition, if multiple stages of the cascade are attempting to provide the same output, it is possible to improve the accuracy of earlier stages based on the output of later stages for the same image.

In some embodiments, one or more earlier-stage neural networks may be updated based on the identification of one or more content features by a later stage neural network. For example, one or more of the first neural network 630 and second neural network 650 may be updated based on an output of the third neural network 670.

In some examples, images where an earlier stage output and a later stage output disagree may be used to improve the reliability of the earlier stage. A back-propagation algorithm can be used to calculate an update to the weights of the earlier stage neural network, by taking the output of the later stage neural network as the ground truth for loss function evaluation. In some examples, a history of upper layer outputs for all images contributing to such training may be maintained. New training data may be chosen based both on the error in output and on diversity compared to the history of previous training data. In this way, a maximally useful set of updates to neural network weights can be calculated. This update of weights is also inherently privacy-preserving, as the actual output is not encoded in it. As such, it is safe to transmit to some central server to update the performance of many such network-attached apparatuses.

In some embodiments, one or more top layers, or output layers, are kept identical for a plurality of the neural networks. In this way, the output of the upper layer directly below the top layers can be directly compared between the different neural networks. This has two benefits. Firstly, if diversity is desired within the input data stream, it is possible to maximise diversity between all of the cache stages between all of the neural networks without also having to store the upper layer output from every neural network separately. Secondly, training (back-propagation) from the upper layer can provide more information to train the network than training from a more restricted set of outputs. This can result in better training from a given number of training images.

In some implementations, the image features may correspond to one or more diagnostic indicators; and the generated output may include at least one diagnostic indication for aiding a diagnosis.

In some implementations, the input data stream may be an audio stream. For example, the input data stream may be an audio input from a microphone, e.g. for hotword detection by a voice-activated assistant. Voice assistant devices spend the majority of their time waiting to hear a hotword before sending a buffer of captured audio for full analysis of the command. In some examples, the hotword may be a verbal phrase e.g. "OK Assistant". The hotword has to be detected near instantaneously, but at lowest possible average computational cost, given the large fraction of the time that it is hearing nothing or non-hotwords. In some implementations, existing digital signal processing algorithms may be incorporated where these result in acceptable false-positive/false-negative rates. For example, an algorithm to detect a threshold level of sound, or an algorithm to fourier-transform the audio to check for human voice frequency range, may be incorporated. As described above, later stages may be implemented with a cascade that achieves better performance or lower computational/power requirements.

The above-described problem of hotword detection is an example of triggering on certain content being observed in an input data stream. This is related to semantic movement detection, where distance of the current sample of data is calculated with respect to a database of other samples. In some examples, this may trigger capture e,g, a hotword, where the database is various trigger words. In some examples, this may avoid capture e.g. lack of meaningful movement, where the database is the recent history of samples. In some examples, the use of a digest of samples, for example the vector of upper layer activations, allows for dense storage of such databases. The more semantically relevant the digest, the more dense the database can be.

Some or all of the different aspects of this invention (diversity, quality, movement, age, velocity, content) can be combined as necessary for a particular application.

Any portions of the invention can be split between processing devices, for example by placing a network connection between buffering components.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the scope of the invention as defined by the appended claims.

The invention claimed is:

1. A computer implemented method of data processing, comprising:
    receiving an input data stream;
    identifying, by a first algorithm, one or more first content features of the data stream;
    determining, based on at least one output of the first algorithm, one or more portions of the data stream to be stored in a first buffer;
    storing the one or more portions of the data stream in the first buffer;
    identifying, by a second algorithm analyzing only the one or more stored portions of the data stream, one or more second content features of the data stream; and
    generating, for output to a user, an output based on the one or more second content features;
    wherein the second algorithm is computationally more complex than the first algorithm,
    wherein the determining one or more portions of the data stream to be stored in the first buffer further comprises determining, based on outputs of a layer of the first algorithm, a substantially fixed proportion of the data stream to be stored in the first buffer,
    wherein each activation of the layer is represented as a point in a multi-dimensional space, and
    wherein at least one portion of the one or more stored portions of the data stream are removed from the first buffer based on a metric distance between points in the multi-dimensional space.

2. The method of claim 1, further comprising:
    determining, based on at least one output of the first algorithm, the at least one portion of the one or more stored portions of the data stream to be removed from the first buffer;
    removing the at least one portion from the first buffer.

3. The method of claim 1, wherein the first algorithm comprises a plurality of processing layers, and wherein the plurality of processing layers comprises the layer.

4. The method of claim 1, wherein the one or more first content features are substantially the same as the one or more second content features, wherein the one or more first content features are inputs for the first algorithm, and wherein the one or more second content features are inputs for the second algorithm.

5. The method of claim 4, wherein the first algorithm and the second algorithm are trained using a common training data set and a common training goal.

6. The method of claim 1, further comprising:
    before the storing the one or more portions of the data stream in the first buffer, pre-processing the one or more portions of the data stream to be stored in the first buffer.

7. The method of claim 1, further comprising:
    updating the first algorithm based on the one or more second content features.

8. The method of claim 1, wherein at least one content feature in the one or more first content features is stored in a second buffer; and
    wherein the determining one or more portions of the data stream to be stored in the first buffer is based at least in part on the at least one content feature stored in the second buffer.

9. The method of claim 1, wherein the data stream is a video stream comprising a plurality of image frames; and
    wherein the one or more first content features and the one or more second content features are image features of the plurality of image frames.

10. The method of claim 9, wherein the image features correspond to people; and
    wherein the generated output is based on an estimated number of people in the video stream.

11. The method of claim 9, wherein the image features correspond to one or more diagnostic indicators; and
    wherein the generated output comprises at least one diagnostic indication for aiding a diagnosis.

12. A data processing apparatus comprising:
    an input for receiving an input data stream;
    a processor; and
    an output;
    wherein the apparatus is configured to perform the method of claim 1.

13. A non-transitory computer-readable storage medium, having instructions stored thereon that, when executed by at least one computing device, cause the at least one computing device to perform operations, the operations comprising the method of claim 1.

* * * * *